United States Patent
Kaneko (10) Patent No.: US 9,892,644 B2
(45) Date of Patent: Feb. 13, 2018

(54) VEHICLE DRIVE ASSIST SYSTEM

(71) Applicant: SUBARU CORPORATION, Tokyo (JP)

(72) Inventor: Norimasa Kaneko, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 390 days.

(21) Appl. No.: 14/295,882

(22) Filed: Jun. 4, 2014

(65) Prior Publication Data

US 2014/0379166 A1     Dec. 25, 2014

(30) Foreign Application Priority Data

Jun. 21, 2013 (JP) ................................. 2013-130794

(51) Int. Cl.
*G08G 1/16* (2006.01)
*G06K 9/00* (2006.01)

(52) U.S. Cl.
CPC ......... *G08G 1/167* (2013.01); *G06K 9/00208* (2013.01); *G06K 9/00798* (2013.01)

(58) Field of Classification Search
CPC ....... G06K 9/00791–9/00798; G06K 9/00208; G08G 1/167
See application file for complete search history.

(56) References Cited

U.S. PATENT DOCUMENTS

| | | | | |
|---|---|---|---|---|
| 2005/0265579 A1* | 12/2005 | Nishida | ............. | G06K 9/00798 382/103 |
| 2005/0273260 A1* | 12/2005 | Nishida | .................... | B60Q 1/34 701/301 |
| 2006/0239509 A1* | 10/2006 | Saito | .................... | G06K 9/6205 382/104 |
| 2007/0164852 A1* | 7/2007 | Litkouhi | ............ | B60G 17/0195 340/435 |
| 2009/0030613 A1* | 1/2009 | Kataoka | ................. | G08G 1/167 701/300 |
| 2009/0153313 A1* | 6/2009 | Roelke | ................. | B62D 15/025 340/435 |

(Continued)

FOREIGN PATENT DOCUMENTS

JP     2011-003075 A     1/2011

OTHER PUBLICATIONS

Kataoka, JP 2012-098803, May 24, 2012 (Machine Translation).*
Sekiguchi, JP 2011-003075, Jan. 6, 2011 (Machine Translation).*

*Primary Examiner* — Courtney D Heinle
(74) *Attorney, Agent, or Firm* — McDermott Will & Emery LLP (57) ABSTRACT

A vehicle drive assist system includes: a lane line recognizing unit that recognizes left and right lane lines defining a lane along which a vehicle equipped with the drive assist system travels; and a drive assist unit that sets lane departure determination thresholds along the left and right lane lines, and performs a drive assist operation based on a relative position of the vehicle to the lane departure determination threshold. The drive assist unit sets a left lane departure determination threshold on the basis of an inner edge of unmelted snow when a left lane line of a traveling lane is recognized based on a front-view image of the vehicle, captured by the lane line recognizing unit, but a right lane line which is covered with the unmelted snow cannot be recognized.

8 Claims, 4 Drawing Sheets

(56) References Cited

U.S. PATENT DOCUMENTS

| | | | |
|---|---|---|---|
| 2010/0138115 A1* | 6/2010 | Kageyama | B60R 21/0134 701/46 |
| 2010/0332050 A1* | 12/2010 | Kobayashi | B60T 8/17557 701/1 |
| 2011/0044503 A1* | 2/2011 | Sato | G06T 7/0085 382/103 |
| 2011/0102579 A1* | 5/2011 | Sung | G06K 9/00798 348/135 |
| 2012/0277957 A1* | 11/2012 | Inoue | B60W 30/12 701/41 |
| 2012/0320210 A1* | 12/2012 | Imai | B60W 30/12 348/148 |
| 2014/0266655 A1* | 9/2014 | Palan | G06K 9/00805 340/435 |
| 2014/0379166 A1* | 12/2014 | Kaneko | G08G 1/167 701/1 |
| 2015/0334385 A1* | 11/2015 | Takemura | H04N 17/002 348/175 |
| 2016/0055383 A1* | 2/2016 | Akamine | G06K 9/66 382/104 |

\* cited by examiner

VEHICLE DRIVE ASSIST SYSTEM

CROSS-REFERENCE TO RELATED APPLICATIONS

The present application claims priority from Japanese Patent Application No. 2013-130794 filed on Jun. 21, 2013, the entire contents of which are hereby incorporated by reference.

BACKGROUND

1. Technical Field

The present invention relates to a vehicle drive assist system in which when unmelted snow is detected on one side of a road surface, a drive assist threshold for a lane line on the other side is mitigated so that a lane departure warning or the like is not frequently activated even when a vehicle equipped the vehicle drive assist system travels nearer to the lane line on the other side.

2. Related Art

In recent years, an integrated drive assist system for actively assisting driving of a driver to improve safety of vehicles has been developed. This type of drive assist system estimates various possibilities such as a collision with a preceding vehicle, a contact with an object, and a lane departure based on a traveling environment of vehicles and a traveling state of a vehicle equipped the vehicle drive assist system ((hereinafter, may be referred to as "subject vehicle") and outputs a warning to the driver of the subject vehicle or performs other control when it is predicted that it is not possible to maintain safety.

In general, a lane departure preventing function which is one of the functions of the drive assist system recognizes lane lines (white lines, orange lines, and the like) in front of the subject vehicle using a sensor such as a camera to estimates a traveling lane of the subject vehicle. When it is determined that the subject vehicle leaves the traveling lane of the subject vehicle, a warning is output or vehicle control is performed so as to prevent the subject vehicle from leaving the lane.

In this case, if a warning is frequently output even when the driver recognizes a lane departure direction, the driver may feel annoyed. Thus, for example, Japanese Unexamined Patent Application Publication (JP-A) No. 2011-3075 discloses a technique in which reference lines for making warning determination are set along left and right lane lines, correction amounts are set for the reference lines based on predetermined conditions, and a lane departure determination threshold is set to be offset by the correction amounts with respect to the outer and inner sides of the lane, respectively, so that the time of output a warning of lane departure matches the feeling of a driver.

When a lane line on one side of a traveling road surface is covered with snow and cannot be recognized, since the lane width decreases substantially, the driver generally decelerates the vehicle and tries to travel along the center of the road surface where no snow is left. In this case, when the drive assist system disclosed in JP-A No. 2011-3075 recognizes a lane line where no snow is left, the drive assist system sets a lane departure determination threshold based on this lane line and offsets the lane departure determination threshold by a predetermined correction amount.

However, when the lane departure determination threshold cannot be offset sufficiently with the correction amount, even when the driver already recognizes the lane departure direction, it is determined that the vehicle has left the lane, a departure warning is output or departure preventing control is performed, which makes the driver feel annoyed.

SUMMARY OF THE INVENTION

The present invention is accomplished in view of the above-mentioned circumstances, and aims to provide a vehicle drive assist system that can reduce the annoyance to the driver without activating a departure warning or the like frequently even when a lane line on one side of a driving road surface is covered with snow and only a lane line on the other side is recognized.

An aspect of the present invention provides a vehicle drive assist system including: a lane line recognizing unit that recognizes left and right lane lines defining a lane along which a vehicle equipped with the drive assist system travels; and a drive assist unit that sets lane departure determination thresholds along the left and right lane lines, and performs a drive assist operation based on a relative position of the vehicle to the lane departure determination threshold. When recognition is made that one of the left and right lane lines is unmelted snow, the drive assist unit mitigates the lane departure determination threshold set to the other lane line.

DETAILED DESCRIPTION

Figure 1:
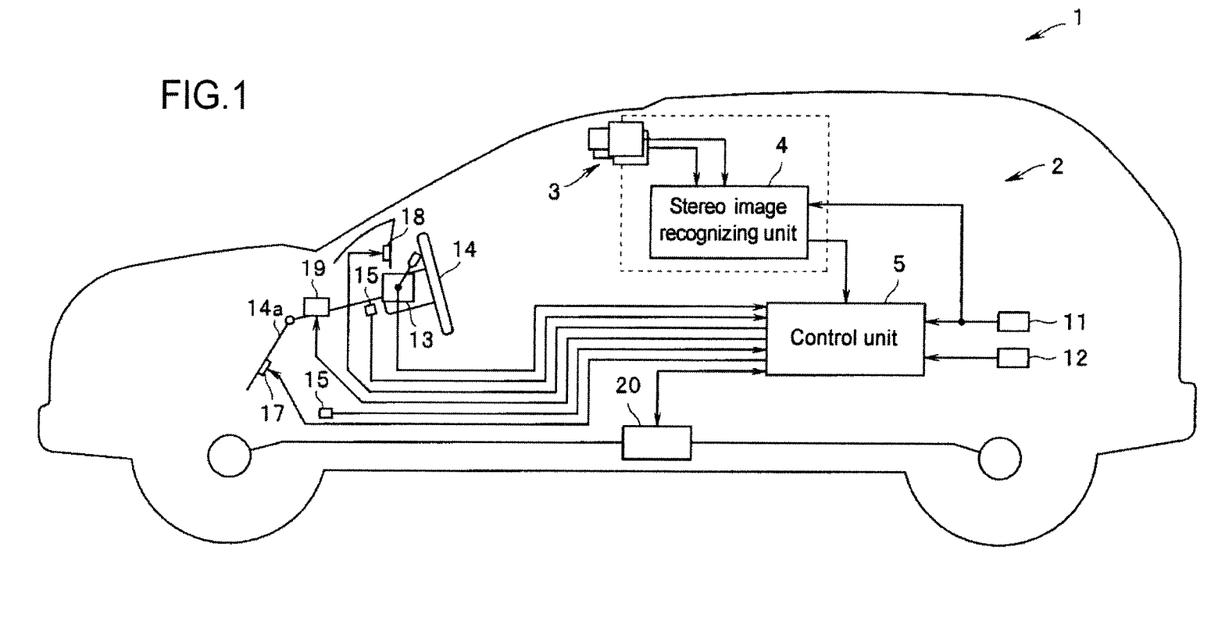
FIG. 1 is a schematic diagram illustrating a configuration of a vehicle drive assist system.

Hereinafter, an implementation of the present invention will be described with reference to the drawings. In FIG. 1, a drive assist system 2 is mounted on a vehicle 1 such as an automobile. The drive assist system 2 includes a stereo camera 3, a stereo image recognizing unit 4, a control unit 5 serving as the drive assist unit of the present invention, and the like.

Moreover, the vehicle 1 includes a vehicle speed sensor 11 that detects a vehicle speed of the vehicle 1, a yaw rate sensor 12 that detects a yaw rate, a main switch 13 that switches on and off respective functions of drive assist control, a steering angle sensor 15 that is provided in a steering shaft 14a connected with a steering wheel 14 so as to detect a steering angle, an accelerator opening sensor 16 that detects the amount (accelerator opening) of step-down of an accelerator pedal by the driver, and the like. Further, a power steering motor 17 that assists a steering operation of the driver is connected with the steering shaft 14a.

Moreover, the stereo camera 3 includes a set of left and right cameras including a main camera and a sub-camera which uses a solid-state device such as a CCD or a CMOS as a stereo optical system. The respective cameras are attached at a certain distance to the ceiling of a vehicle chamber on the backside of a front window to capture a pair of stereo images of an object outside the vehicle from different points in time to obtain image data and transmits the image data to the stereo image recognizing unit 4.

First, the stereo image recognizing unit 4 obtains distance information from an amount of deviation of the positions corresponding to the pair of stereo images in the traveling direction of the vehicle 1 captured by the stereo camera 3 to generate a distance image. The stereo image recognizing unit 4 performs a well-known grouping process based on the distance image data and compares the distance image data with a frame (window) stored in advance such as 3-dimensional road profile data, side wall data, or solid object data to thereby recognize a traveling environment in front of the vehicle 1. That is, the stereo image recognizing unit 4 extracts lane line data, side wall data such as guard rails extending along the road or curbs, and various types of solid object data such as vehicles, pedestrians, or telephone poles from the distance image data as information on the traveling environment in front of the vehicle 1.

Figure 3:
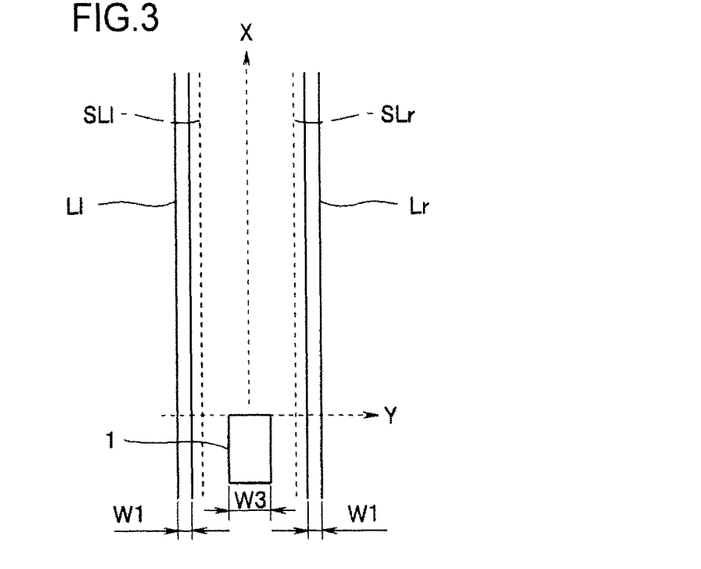
FIG. 3 is a diagram for describing the lane departure determination threshold.

More specifically, the stereo image recognizing unit 4 has the function of the lane line recognizing unit of the present invention and recognizes left and right lane lines Ll and Lr. The function of the lane line recognizing unit is to obtain data of coordinates of the positions of the left and right lane lines Ll and Lr in front of the vehicle 1 in an X-Y coordinate system defined based on the position and the direction of the vehicle 1 as illustrated in FIG. 3. Here, the lane lines Ll and Lr mean boundary lines drawn to define a traveling lane of the vehicle 1 and mean lines in their broadest sense regardless of whether the lines are white lines, orange lines, solid lines, or broken lines. In the present implementation, the stereo image recognizing unit 4 is integrated with the stereo camera 3 as a module and is held on the front side of the ceiling inside the vehicle chamber together with the stereo camera 3.

When the driver operates the main switch 13 to instruct execution (ON) of a lane departure preventing function which is one of drive assist control, the control unit 5 sets lane departure determination thresholds SLl and SLr at positions separated by a predetermined distance from the inner side or the outer side (in the present implementation, the inner side is used as a reference) of the lane lines Ll and Lr that define a traveling lane of the vehicle 1. FIG. 3 illustrates that the lane departure determination thresholds SLl and SLr are set to the inner side of the left and right lane lines Ll and Lr. Here, the inner sides of the lane lines Ll and Lr mean the inner sides in the vehicle width direction facing each other and the outer sides of the lane lines Ll and Lr mean the outer sides in the vehicle width direction facing the opposite directions.

Figure 5:
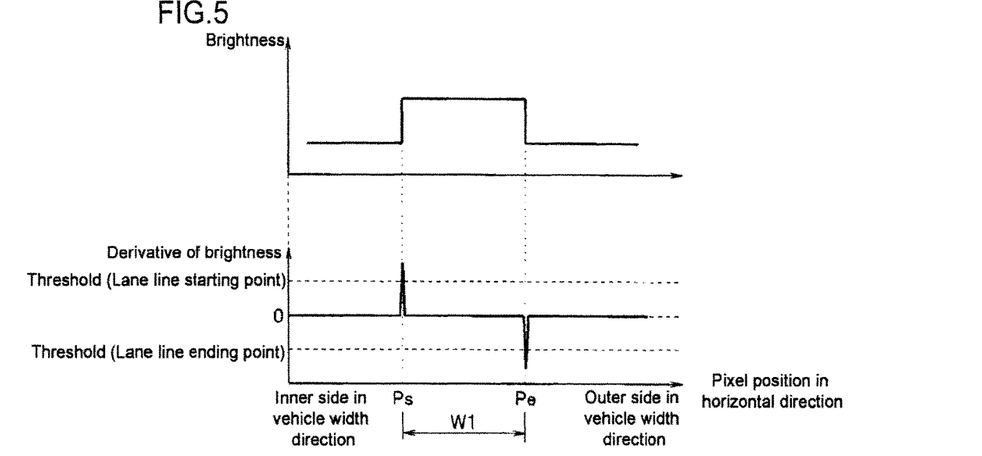
FIG. 5 is a diagram for describing brightness at the starting and ending points of a lane line and a change in a derivative of the brightness.

Next, a method of detecting the lane lines Ll and Lr will be described briefly. First, a starting point Ps and an ending point Pe are sequentially detected based on the image obtained from the stereo camera 3. That is, edges on respective search lines are detected in left and right lane line detection regions set on a reference image in a direction from the inner side to the outer side in the vehicle width direction with respect to an image central line (or the traveling direction estimated from a steering angle or the like) to search for an edge point indicating the starting point Ps. Specifically, as illustrated in FIG. 5, when searching is performed in the direction from the inner side to the outer side in the vehicle width direction, for example, a point (edge point) at which the brightness of a pixel on the outer side in the vehicle width direction is relatively higher than the brightness of the pixel on the inner side and a derivative of the brightness indicating a variation amount thereof is equal to or larger than a predetermined positive-side threshold is detected as a starting point Ps. Here, in order to simplify computations, when searching is performed in the direction from the inner side to the outer side in the vehicle width direction on the search lines, only the edge point (that is, the edge point detected on the innermost side in the vehicle width direction) detected first is detected as the starting point Ps.

Moreover, the ending point Pe is detected in the following manner. Edges on the search lines are detected in the left and right lane line detection regions set on the reference image in a direction from the inner side to the outer side in the vehicle width direction with respect to the image central line (or the traveling direction estimated from the steering angle or the like) to search for an edge point indicating the ending point Pe. Specifically, as illustrated in FIG. 5, when searching is performed in the direction from the inner side to the outer side in the vehicle width direction, for example, a point (edge point) at which the brightness of a pixel on the outer side in the vehicle width direction is relatively lower than the brightness of the pixel on the inner side and a derivative of the brightness indicating a variation amount thereof is equal to or smaller than a predetermined negative-side threshold is detected as a starting point Ps. Here, in order to simplify computations, when searching is performed in the direction from the inner side to the outer side in the vehicle width direction on the search lines, only the edge point (that is, the edge point detected on the innermost side in the vehicle width direction) detected first is detected as the ending point Pe. Moreover, the control unit 5 obtains a line width W1 from the position coordinates of the starting point Ps and the ending point Pe (see FIG. 6). The corresponding distance information on the distance image is added to the detected starting and ending points Ps and Pe.

Moreover, when it is determined that a traveling path of the vehicle 1 crosses the left or right lane departure determination threshold SLl or SLr within a predetermined distance (for example, 10 to 16 m) in front of the vehicle 1, the control unit 5 determines that the vehicle 1 is highly likely to leave the current traveling lane lines Ll and Lr and outputs lane departure warning. In the present implementation, the lane departure warning is output in different forms according to the vehicle speed, for example. Specifically, the control unit 5 outputs warnings using only a warning lamp 18 arranged on a combination meter when the vehicle speed is lower than 50 Km/h and outputs warnings using both the warning lamp 18 and a warning buzzer 19 when the vehicle speed is equal to or higher than 50 Km/h, for example.

Further, when the vehicle 1 actually crosses the left or right lane departure determination threshold SLl or SLr, the control unit 5 generates an assist torque to the power steering motor 17 in a direction of avoiding lane departure and transmits a brake signal to an active booster 20 as necessary to operate the brake so as to decelerate the vehicle 1.

Figure 4:
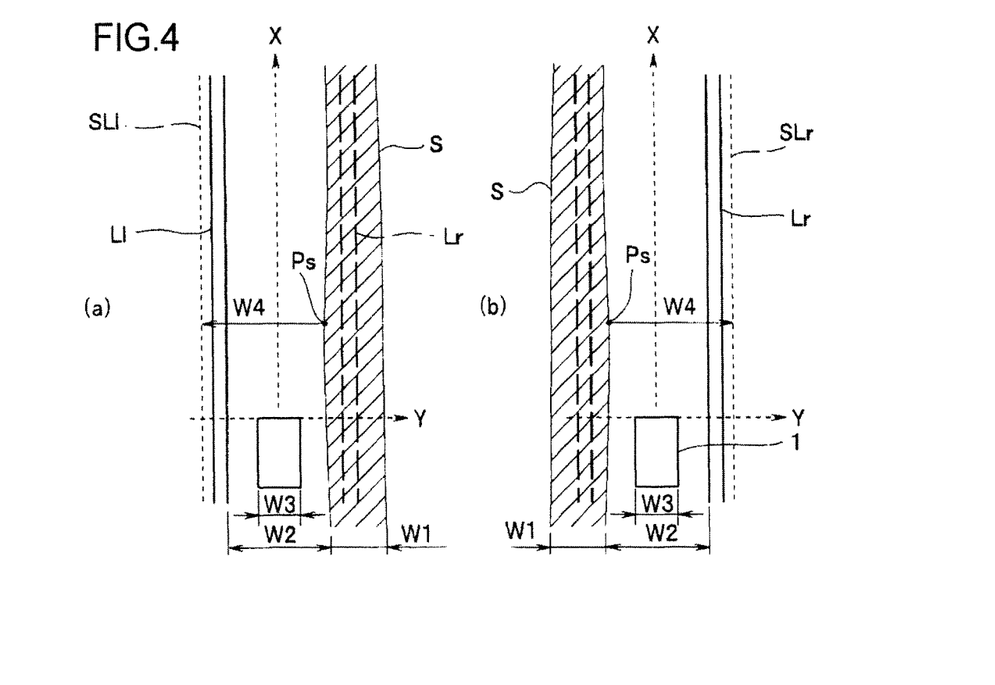
FIG. 4A is a diagram for describing a lane departure determination threshold set when a right lane line is covered with unmelted snow.
FIG. 4B is a diagram for describing a lane departure determination threshold set when a left lane line is covered with unmelted snow.
Figure 6:
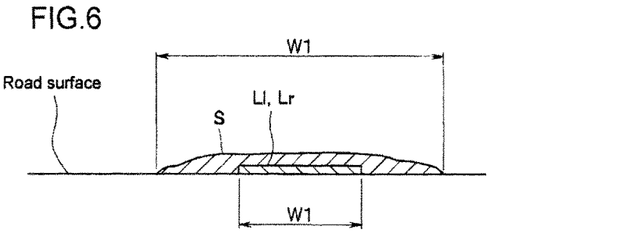
FIG. 6 is a cross-sectional view of a lane line covered with unmelted snow.

However, as illustrated in FIGS. 4A and 4B, when one of the lane lines Ll and Lr (the right lane line Lr in FIG. 4A and the left lane line Ll in FIG. 4B) is covered with unmelted snow S, the line width W1 of the unmelted snow S is naturally larger than the line width W1 of the lane line Ll or Lr, as illustrated in FIG. 6. Thus, when the lane line Lr on one side (the right side in FIG. 4A and the left side in FIG. 4B) of the traveling lane is covered with unmelted snow S, the width of the traveling lane of the vehicle 1 decreases substantially. In general, since a driver tries to travel along the center of a traveling lane, when the lane width decreases substantially, the driver decreases the vehicle speed and tries to travel along the center of the road surface where no unmelted snow S is present.

In this case, when the control unit 5 recognizes the left lane line Ll and sets the left lane departure determination threshold SLl as illustrated in FIG. 3 on the inner side of the left lane line Ll, since the lane width is small, the possibility that the vehicle 1 has approached too close to or crosses the left lane departure determination threshold SLl increases. As a result, regardless of whether the driver recognizes with the naked eyes that the vehicle 1 has approached too close to the lane line Ll, a departure warning or departure preventing control is activated, which makes the driver feel annoyed.

The line width W1 of the lane lines Ll and Lr is set to approximately 14 to 20 cm, and the line width W1 (see FIG. 6) of the unmelted snow S covering the lane line Ll or Lr is naturally larger than the line width W1 of the lane lines Ll and Lr. Thus, a line width determination threshold WS1 is set to a value (for example, approximately 24 cm) slightly larger than the line width W1, and the line width determination threshold WS1 is compared with the line width W1. When the line width W1 is smaller than the line width determination threshold WS1, it is determined that the line width W1 detected is the lane line Ll or Lr. When the line width W1 is larger than the line width determination threshold WS1, it is determined that the line width W1 detected is the unmelted snow S.

When the line width W1 is determined to be the unmelted snow S, the lane departure determination threshold (SLl in FIG. 4A and SLr in FIG. 4B) set for the other lane line (Ll in FIG. 4A and Lr in FIG. 4B) is set based on the starting point Ps at which the inner edge of the unmelted snow S rather than the lane line Ll is detected.

Figure 2:
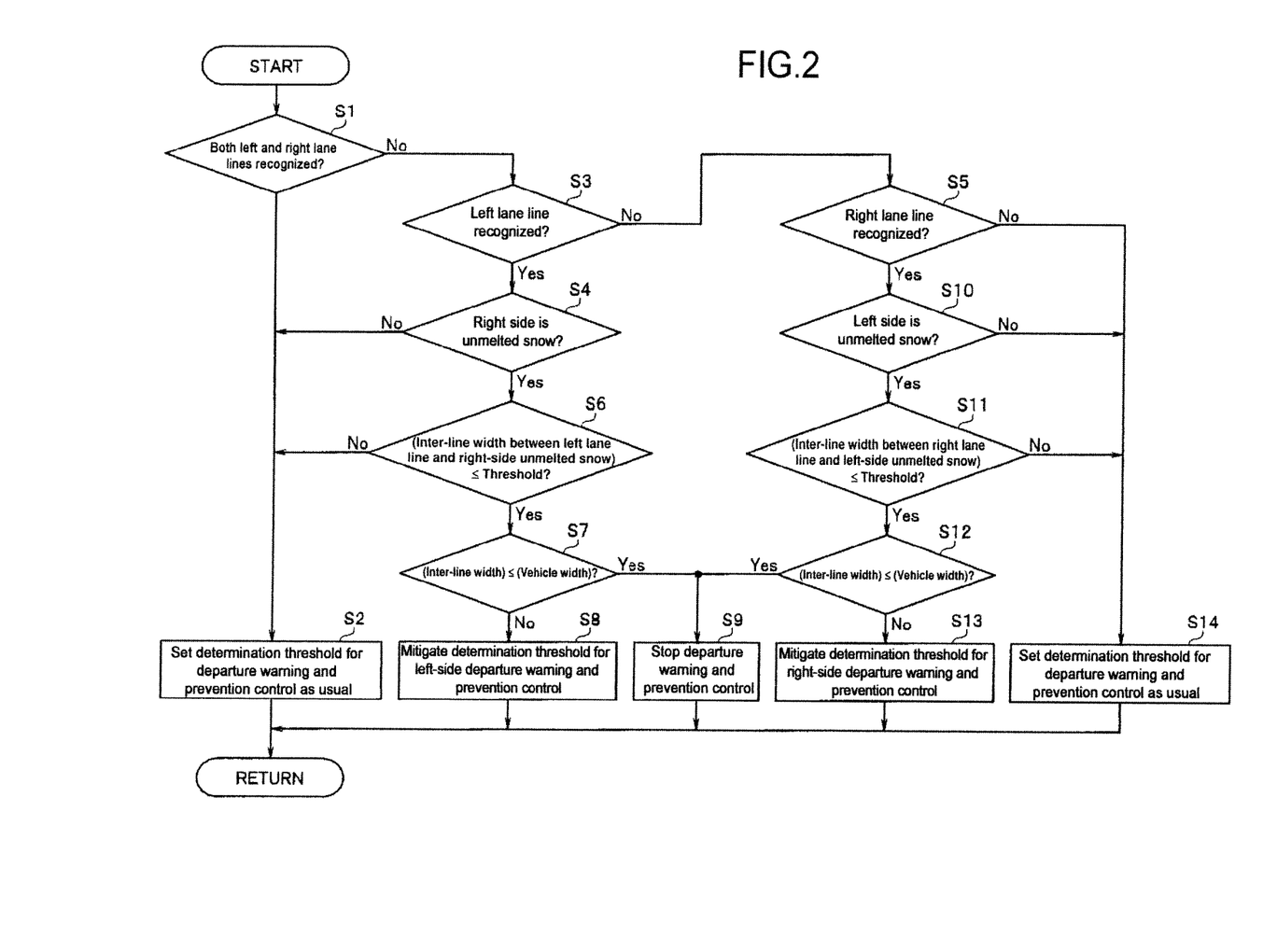
FIG. 2 is a flowchart illustrating a lane departure determination threshold setting routine.

The setting of the lane departure determination threshold executed by the control unit 5 is performed according to a lane departure determination threshold setting routine illustrated in FIG. 2. When the drive assist system 2 mounted on the vehicle 1 is powered on and a program installed in the control unit 5 is activated, first, in step S1, it is examined whether both the load sharing ratio Ll and Lr are recognized. As described above, the lane lines Ll and Lr are recognized in the following manner. The inner edge and the outer edge are detected from a difference in brightness, and the line width W1 between the starting point Ps set at the inner edge and the ending point Pe set at the outer edge on the same line is compared with the line width determination threshold WS1. When W1<WS1, it is recognized that the line detected is the lane line Ll or Lr. When W1≥WS1, it is recognized that the line detected is not the lane line but the unmelted snow S.

When the left and right lane lines Ll and Lr are recognized (that is, when the vehicle travels along a normal road surface), the flow proceeds to step S2 where the lane departure determination threshold SLl and SLr are set to the inner side (or the outer side) of the recognized lane lines Ll and Lr as usual, and this routine ends.

On the other hand, both or any one of the lane lines Ll and Lr is not recognized, the flow proceeds to step S3. In steps subsequent to step S3, it is determined which of the lane lines Ll and Lr is recognized. That is, in step S3, it is examined whether the left lane line Ll is recognized. When the left lane line Ll is recognized, the flow proceeds to step S4. When the left lane line Ll is not recognized, the flow proceeds to step S5.

In step S4, it is examined whether the right lane line is unmelted snow S. As described above, when the line width W1 between the detected starting and ending points Ps and Pe is equal to or larger than the line width determination threshold WS1 (W1≥WS1), it is recognized that the right lane line is unmelted snow S. Moreover, when the right lane line Lr is not recognized (that is, when at least one of the starting point Ps and the ending point Pe is not detected), it is determined that the right lane line Lr is worn off. Then, the flow returns to step S2 where the left lane departure determination threshold SLl is set to the inner side (or the outer side) of the recognized left lane line Ll as usual, and this routine ends. In this case, the right lane departure determination threshold SLr may be set to a position located at a predetermined distance from the left lane departure determination threshold SLl.

When the flow proceeds from step S4 to step S6, the distance between the left lane line Ll and the right-side unmelted snow S (that is, the distance (inter-line width) W2 between both starting points Ps) is compared with an inter-line width determination threshold WS2. The inter-line width determination threshold WS2 is a width of a lane through which the vehicle 1 can pass at a low speed (for example, 20 to 40 Km/h), and is set to approximately 2.2 to 3.0 m when the vehicle width W3 of the vehicle 1 is approximately 1.8 m. When the inter-line width W2 exceeds the inter-line width determination threshold WS2 (W2>WS2), the flow returns to step S2 where the lane departure determination thresholds SLl and SLr are set to the inner sides of the recognized right lane line Lr and the left-side unmelted snow S, and this routine ends.

On the other hand, when the inter-line width W2 is equal to or smaller than the inter-line width determination threshold WS2 (W2≤WS2), the flow proceeds to step S7 where the inter-line width W2 is compared with the vehicle width W3. When the inter-line width W2 exceeds the vehicle width W3 (WS2≥W3), the flow proceeds to step S8. When the inter-line width W2 is equal to or smaller than the vehicle width W3 (W2≤W3), the flow proceeds to step S9.

In step S8, the right lane departure determination threshold SLr is set to a position separated by a predetermined distance from the inner edge of the unmelted snow S and a process of mitigating the left lane departure determination threshold SLl is performed. Then, this routine ends.

In the process of mitigating the left lane departure determination threshold SLl the left lane departure determination threshold SLl is set to a position separated by a predetermined distance W4 toward the left lane line Ll on the same line from the starting point Ps that is set at the inner edge of the right-side unmelted snow S illustrated in FIG. 4A, for example. This distance W4 is set based on the vehicle width W3 of the vehicle 1 and may be the same value as the inter-line width determination threshold WS2, for example.

In general, when the road width of a traveling lane decreases, a driver decreases the vehicle speed to a vehicle speed at which the vehicle 1 can pass the lane without colliding with a side wall or the like and travels while checking with the eyes. In this case, for example, when the vehicle 1 leaves the left lane line Ll, unlike the conventional system, a departure warning or departure preventing control is not activated, hence it is possible to reduce the annoyance to the driver. However, when it is determined that the traveling path of the vehicle 1 crosses the left lane departure determination threshold SLl set presently in a predetermined forward distance of the vehicle 1, the lane departure warning is output.

On the other hand, when the flow proceeds from step S7 to step S9, a departure warning and departure preventing control are stopped and this routine ends. When it is determined in step S7 that the inter-line width W2 is equal to or smaller than the vehicle width W3 (W2≤W3), since it is thought that the driver personally judges whether it is possible to drive the vehicle 1 to pass through the inter-line width W2 and then travels while decreasing the vehicle speed sufficiently, it is possible to reduce annoyance by stopping the departure warning and the departure preventing control.

Moreover, when it is determined that the left lane line Ll is not recognized and the flow proceeds to step S5, it is examined whether the right lane line Lr is recognized. When the right lane line Lr is recognized, the flow proceeds to step S10. When the right lane line Lr is not recognized (that is, any one of the left and right lane lines Ll and Lr is not recognized), the flow proceeds to step S14.

In step S10, it is examined whether the left side is unmelted snow S or is not recognized. The determination on unmelted snow S has been described in step S4, and the description thereof will not be provided.

When it is determined that the left side is unmelted snow S, the flow proceeds to step S11. When it is determined that the left lane line Ll is worn off and cannot be recognized, the flow proceeds to step S14.

In step S11, the distance (that is, the inter-line width W2) between the right lane line Lr and the left-side unmelted snow S is compared with the inter-line width determination threshold WS2 to examine whether the inter-line width W2 is equal to or smaller than the inter-line width determination threshold WS2. When the inter-line width W2 exceeds the inter-line width determination threshold WS2 (W2>WS2), the flow proceeds to step S14. On the other hand, when the inter-line width W2 is equal to or smaller than the inter-line width determination threshold WS2 (W2≤WS2), the flow proceeds to step S12 where the inter-line width W2 is compared with the vehicle width W3. When the inter-line width W2 exceeds the vehicle width W3 (WS2≥W2>W3), the flow proceeds to step S13. When the inter-line width W2 is equal to or smaller than the vehicle width W3 (W2≤W3), the flow returns to step S9.

In step S13, the left lane departure determination threshold SLl is set to a position separated by a predetermined distance from the inner edge of the unmelted snow S and a process of mitigating the right lane departure determination threshold SLr is performed. Then, this routine ends. In the process of mitigating the right lane departure determination threshold SLr, the right lane departure determination threshold SLr is set to a position separated by the predetermined distance W4 toward the right lane line Lr on the same line from the starting point Ps that is set at the inner edge of the left and right-side unmelted snow S illustrated in FIG. 4B, for example. This distance W4 is set based on the vehicle width W3 of the vehicle 1 as described above.

On the other hand, when the flow returns from step S12 to step S9, a departure warning and departure preventing control are stopped and this routine ends. When it is determined in step S12 that the inter-line width W2 is equal to or smaller than the vehicle width W3 (W2≤W3), since it is thought that the driver personally judges whether it is possible to drive the vehicle 1 to pass through the inter-line width W2 and then travels while decreasing the vehicle speed sufficiently, it is possible to reduce annoyance by stopping the departure warning and the departure preventing control.

Moreover, when the flow proceeds from step S5, S10, or S11 to step S14, the lane departure determination thresholds SLl and SLr are set as usual and this routine ends.

In this case, since any one of the left and right lane lines Ll and Lr is not recognized in step S5, even when the process of step S14 is executed, the lane departure determination thresholds SLl and SLr are not set and the process stops. On the other hand, although in step S10, the left lane line Ll is worn off and cannot be recognized even if the right lane line Lr is recognized, the left lane departure determination threshold SLl may be set to a position separated by a predetermined distance from the right lane departure determination threshold SLr. On the other hand, since it is determined in step S11 that the inter-line width W2 exceeds the inter-line width determination threshold WS2 (W2>WS2), the lane departure determination thresholds SLl and SLr are set in step S14.

As described above, in the present implementation, when one of the left and right lane lines Ll and Lr is covered with unmelted snow S and only the lane line on the other side is recognized, the lane departure determination threshold set for the lane line on the other side is mitigated. Even when the road width is substantially small and the driver drives the vehicle 1 so as to travel along the center of the road surface where the unmelted snow S is not present, a departure warning is not frequently activated or departure preventing control is not executed. Thus, it is possible to reduce annoyance to the driver.

The invention claimed is:

1. A vehicle drive assist system comprising:
a lane line recognizing unit that recognizes left and right lane lines defining a lane along which a vehicle equipped with the vehicle drive assist system travels; and
a drive assist unit that sets lane departure determination thresholds along the left and right lane lines, respectively, and performs a drive assist operation based on a relative position of the vehicle to the lane departure determination thresholds, wherein
when recognition is made that one of the left and right lane lines is covered by unmelted snow based on a comparison of a line width of the lane line with a predetermined width, the drive assist unit sets the lane departure determination threshold for the other of the lane lines in accordance with the detection of unmelted snow instead of the covered left or right lane line, and
when an inter-line width between an inner edge of the unmelted snow on the one of the lane lines and the other of the lane lines is determined to exceed an inter-line width at which the vehicle can pass through the inter-line width, the drive assist unit sets the lane departure determination threshold for the other of the lane lines to a position separated by a predetermined distance from an inner edge of the unmelted snow.

2. The vehicle drive assist system according to claim 1, wherein the drive assist unit compares a line width between an inner edge and an outer edge of the one of the recognized left or right lane lines with a predetermined line width determination threshold and determines that the one of the recognized left or right lane lines is covered by unmelted snow when the line width exceeds the line width determination threshold.

3. The vehicle drive assist system according to claim 1, wherein the drive assist unit stops drive assist operation when the inter-line width between an inner edge of the unmelted snow on the one of the lane lines and the other of the lane lines is equal to or smaller than the vehicle width of the vehicle.

4. The vehicle drive assist system according to claim 1, wherein the predetermined distance is based on a vehicle width of the vehicle.

5. The vehicle drive assist system according to claim 1, wherein the inter-line width at which the vehicle can pass through the inter-line width used in the determination is a vehicle width of the vehicle, and the drive assist unit setting the lane departure determination threshold for the other of the lane lines to the position separated by the predetermined distance from the inner edge of the unmelted snow is also based on a determination that the inter-line width between an inner edge of the unmelted snow on the one of the lane lines and the other of the lane lines is equal to or less than an inter-line width determination threshold at which the vehicle can pass through the inter-line width.

6. The vehicle drive assist system according to claim 5, wherein when recognition is made that one of the recognized left and right lane lines is covered by unmelted snow, the drive assist unit sets the lane departure determination threshold for the covered lane line on the basis of an inner edge of the unmelted snow.

7. A vehicle drive assist system comprising:

a lane line recognizing unit that recognizes left and right lane lines defining a lane along which a vehicle equipped with the vehicle drive assist system travels; and a drive assist unit that sets lane departure determination thresholds along the left and right lane lines, respectively, and performs a drive assist operation based on a relative position of the vehicle to the lane departure determination thresholds, wherein when recognition is made that one of the recognized left and right lane lines is a lane line covered by unmelted snow, and when an inter-line width between an inner edge of the unmelted snow on the one of the lane lines and the other of the lane lines is determined to be equal to or less than an inter-line width determination threshold at which the vehicle can pass through the inter-line width, the drive assist unit sets the lane departure determination threshold for the covered lane line on the basis of an inner edge of the unmelted snow and sets the lane departure determination threshold for the other of the lane lines based on a predetermined distance from an inner edge of the unmelted snow.

8. The vehicle drive assist system according to claim 7, wherein the predetermined distance is based on a vehicle width of the vehicle.

\* \* \* \* \*